United States Patent [19]

Hashimoto et al.

[11] Patent Number: 4,937,799
[45] Date of Patent: Jun. 26, 1990

[54] METHOD AND APPARATUS FOR SETTING LIGHT QUANTITY MOST SUITABLE FOR REPRODUCING INFORMATION FROM AN OPTICAL RECORDING MEDIUM

[75] Inventors: Norio Hashimoto, Tokyo; Eiichi Fujii, Yokohama, both of Japan

[73] Assignee: Canon Kabushiki Kaisha, Tokyo, Japan

[21] Appl. No.: 396,798

[22] Filed: Aug. 21, 1989

Related U.S. Application Data

[63] Continuation of Ser. No. 938,286, Dec. 5, 1986, abandoned.

[30] Foreign Application Priority Data

Dec. 13, 1985 [JP] Japan ............................ 60-279331

[51] Int. Cl.$^5$ ..................... G11B 7/125; G11B 13/04
[52] U.S. Cl. ..................................... 369/13; 369/116; 360/114
[58] Field of Search ................. 369/13, 116, 54, 100, 369/109, 106, 123; 360/114, 59; 365/122; 346/76 L; 250/205; 372/29

[56] References Cited

U.S. PATENT DOCUMENTS

| | | | |
|---|---|---|---|
| 3,368,209 | 2/1968 | McGlauchlin et al. | 365/122 |
| 4,051,329 | 9/1977 | Blondet et al. | 369/116 |
| 4,243,849 | 1/1981 | Goshima et al. | 369/62 |
| 4,443,695 | 4/1984 | Kitamura | 250/205 |
| 4,516,242 | 5/1985 | Yokota | 369/116 |
| 4,580,044 | 4/1986 | Hongo et al. | 369/116 |
| 4,631,713 | 12/1986 | Romeas et al. | 369/116 |
| 4,633,338 | 12/1986 | Sato et al. | 360/114 |
| 4,712,203 | 12/1987 | Saito et al. | 360/114 |

FOREIGN PATENT DOCUMENTS

2083677 3/1982 United Kingdom .................. 369/13

*Primary Examiner*—Steven L. Stephan
*Assistant Examiner*—Hoa T. Nguyen
*Attorney, Agent, or Firm*—Fitzpatrick, Cella, Harper & Scinto

[57] ABSTRACT

An optomagnetic (magneto-optic) information reproducing or readout method including illuminating an optomagnetic (magneto-optic) recording medium with a linearly polarized light flux whose quantity is variable, detecting the value of the illumination flux from the recording medium through an analyzer, determining a threshold quantity of light at which the ratio between the detected value and the quantity of illumination light starts to deviate from a predetermined value, and scanning the recording medium with the linearly polarized light flux whose quantity is smaller than the threshold quantity of light, thereby reproducing or reading out the information stored on the recording medium. A device adapted to carry out the above-described method is also described.

6 Claims, 4 Drawing Sheets

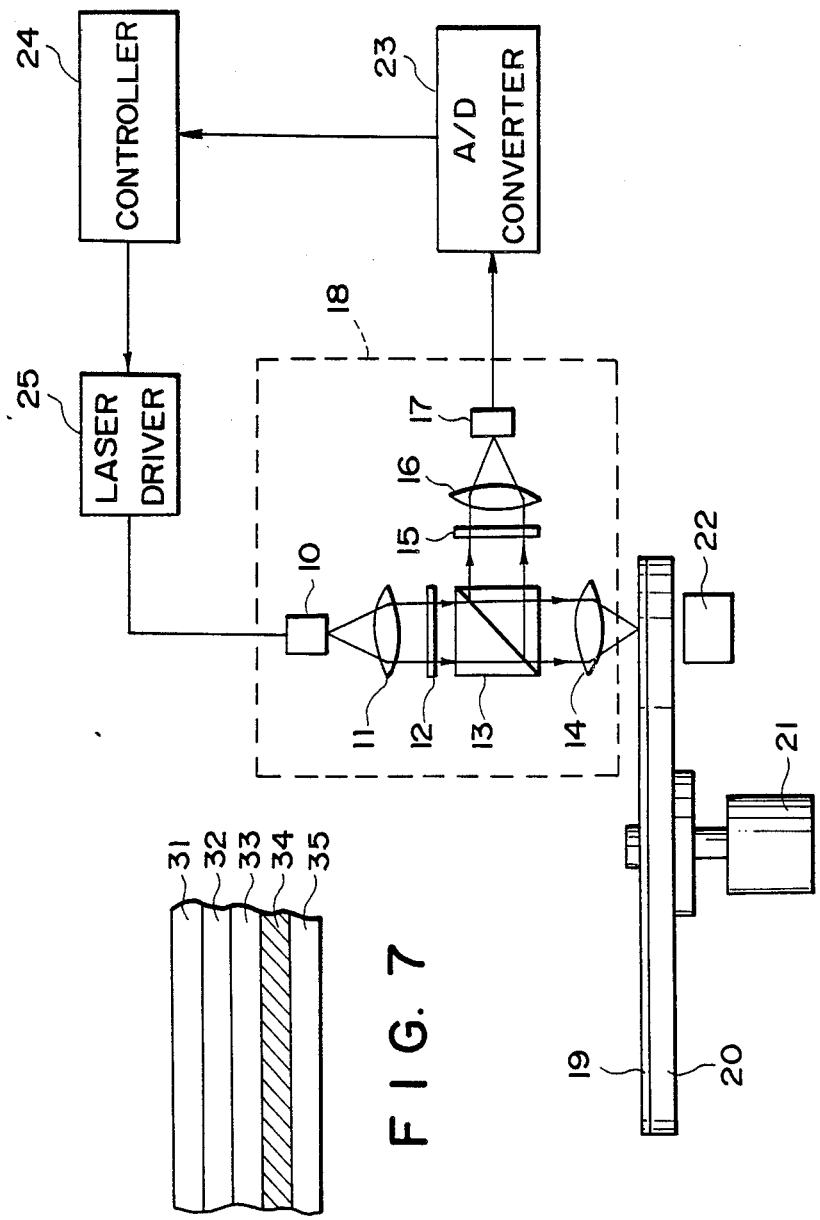

METHOD AND APPARATUS FOR SETTING LIGHT QUANTITY MOST SUITABLE FOR REPRODUCING INFORMATION FROM AN OPTICAL RECORDING MEDIUM

This application is a continuation of application Ser. No. 06/938,286 filed Dec. 5, 1986.

BACKGROUND OF THE INVENTION

1. Field of the Invention

The present invention relates to a method for reproducing information stored in an optomagnetic recording medium on which information is magnetically recorded and a device for carrying out the same method.

2. Related Background art

Recently, extensive studies and experiments of optical memory elements utilizing laser beams in order to obtain high data packaging density and large capacity memories or storages have been increasingly conducted. Among them, optomagnetic recording processes have been receiving increasing attention as a rewritable recording process and optomagnetic recording media used in such optomagnetic recording processes are greatly expected as rewritable optical memory or storage elements.

In general, with an optomagnetic recording medium the recording, reproduction and erasure are carried out in the manner described below.

In the case of the information recording mode, a recording medium is magnetized in a predetermined direction vertical to a substrate and then the laser beam spot which is modulated by the recording signal is projected on the recording medium. The medium can be magnetized in any predetermined direction. The spot of the medium, at which the laser beam is incident absorbs the light and its temperature is locally raised. When the temperature at this spot reaches about a Curie point of the material of the medium, an auxiliary magnetic field in the direction opposite to the direction of initial magnetization is applied so that the direction of magnetization at this spot is reversed, so that the reversed magnetic domain whose direction of magnetization is opposite to other portions impinged upon by with the laser beam is defined, whereby information is stored.

In the erasure mode, the information recorded spot is continuously illuminated with the laser beam so that the temperature of the recorded spot rises closer to a Curie point and then the magnetic field in the direction opposite to the direction of magnetization in the recording mode is applied, so that the recorded spot is returned to the state in which the magnetization direction of this spot is that of initial magnetization.

In the case of reading mode, the continuous laser beam whose power is decreased illuminates the recording medium, thereby reading out the direction of magnetization of recorded spots by utilizing the magnetic Kerr effect.

In this case, there arises the problem how to determine the level of the reproducing laser beam. The quantity of the reproducing laser beam must be so selected that magnetization will not be reversed in direction due to the temperature rise of the recording medium resulting from the illumination of the laser beam. However, if the quantity of the reproducing laser beam is too small, the quantity of the detected light is decreased, so that it becomes impossible to increase the S/N ratio of the reproduced signal. It follows therefore that the quantity of the reproducing laser beam should be slightly smaller than that (threshold quantity of light) at which the reversal of the direction of magnetization occurs.

However, the above-described threshold quantity of light cannot be uniquely determined because of variations in sensitivity of individual recording medium, aging of an sensitivity, environmental temperatures and so on. Therefore, in the prior art devices, variations in threshold quantity of light are taken into consideration and a quantity of light far smaller than a threshold is used in the reproduction or reading of information, so that the S/N ratio of the reproduced signal cannot be increased.

SUMMARY OF THE INVENTION

In view of the above, the primary object of the present invention is to provide an optomagnetic information reproducing method and a device best adapted to carry out the method which can substantially solve the above and other problems encountered in the prior art methods and devices so that the reproduced signal having a relatively satisfactorily high S/N ratio can be obtained without erroneously causing the reversal of the direction of magnetization.

To the above and other ends, the present invention provides an optomagnetic information reproducing method comprising the steps of illuminating an optomagnetic recording medium with a linearly polarized light flux whose quantity of light is varied, accomplishing the optoelectric detection of the illumination flux back from said recording medium through an analyzer, detecting a threshold quantity of light at which the ratio between the detected value and said quantity of light starts to vary from a predetermined value and scanning said recording medium with the linearly polarized light flux whose quantity of light is smaller than said threshold quantity of light, thereby reproducing or reading the information stored in said recording medium and a device adapted to carry out the same method.

BRIEF DESCRIPTION OF THE DRAWINGS

FIG. 6 is a schematic view illustrating the construction of an optomagnetic information reproduction or readout device in accordance with the present invention;

FIG. 7 is a schematic sectional view illustrating an optomagnetic recording medium used in the present invention.

DESCRIPTION OF THE PREFERRED EMBODIMENT

Now the present invention will be described in detail with reference to the accompanying drawings.

Figure 1A:
FIGS. 1A–1D are schematic views used to explain the underlying principle of an optomagnetic information reproduction or readout method in accordance with the present invention.
Figure 1B:
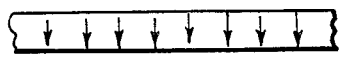
Figure 1C:
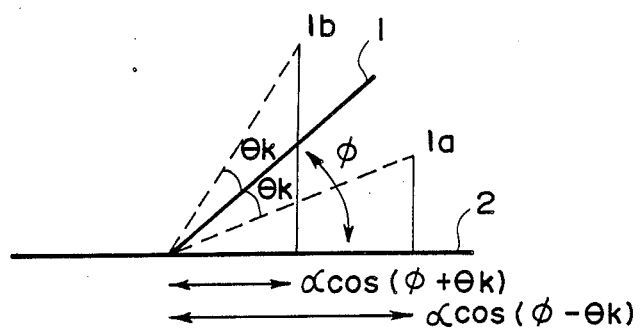
Figure 1D:
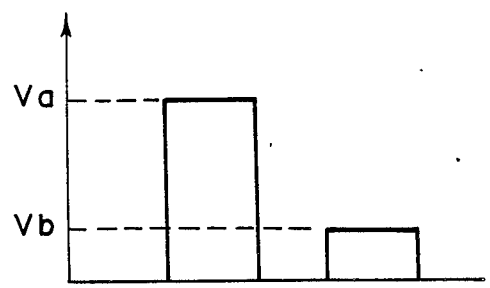

Referring first to FIGS. 1A–1C, a process for converting the magnetic Kerr rotation of the reproducing laser beam into an information signal will be described. FIGS. 1A and 1B show the directions of magnetization of a recording medium; FIG. 1C is a view illustrating the magnetic Kerr rotation of the reproducing laser beam (which is linearly polarized for the sake of simplicity in explanation) depending upon the direction of magnetization of the recording medium; and FIG. 1D shows the electric signals obtained by the conversion of polarized light.

In FIG. 1C, reference numeral 1 represents the direction of polarization of light incident onto the recording medium; 1a, the direction of polarization of light reflected from the recording medium which is magnetized in the direction indicated in FIG. 1A; and 1b, the direction of polarization of light reflected from the recording medium which is magnetized in the direction indicated in FIG. 1B. In this case, the angle of Kerr rotation is represented by $\theta_k$. Reference numeral 2 indicates the transmission axis of an analyzer disposed at an angle $\phi$ in relation to the direction of polarization 1 of the incident light. The polarized light 1a and the polarized light 1b are made incident on the analyzer so that they are converted by a detecting system consisting of a PIN diode and so on and succeeding the analyzer into the electrical signals in proportion to $\cos(\phi - \theta_k)$ and $\cos(\phi + \theta_k)$ (for instance, the voltage, Va and Vb, respectively, as shown in FIG. 1D). Voltage, Va, is derived from the portion magnetized in the direction indicated by FIG. 1A, while Vb, from the portion magnetized in the direction indicated by FIG. 1B. Thus, the information recorded on the recording medium is read out.

Next referring to FIGS. 2-5, the method for determining the quantity of illuminating light which prevents reversal of the direction of magnetization in the readout mode will be described.

Figure 2:
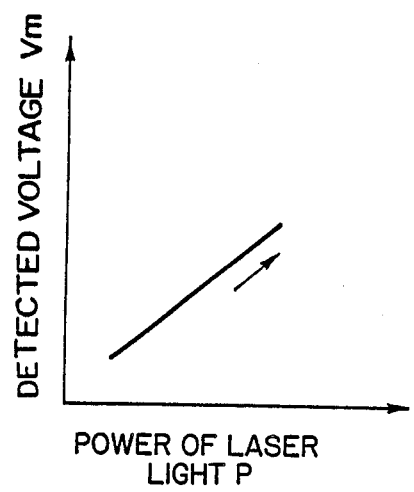
FIGS. 2 to 5 are graphs each illustrating the relationship between the reproducing laser beam power and the optoelectrically detected voltage.

Now it is assumed that an information storage portion having some area on a recording medium (for instance, one track) is uniformally magnetized (or erased) in the direction indicated by FIG. 1A. Then, when the laser power P is varied (in this case increased), the quantity of light is substantially increased. Therefore, as shown in FIG. 2, the detected voltage $V_m$ is increased in proportion to the increase of the laser power P. In this case, the detected voltage $V_m$ refers to an average value of detected voltages within a predetermined interval (for instance, a batch of one track or one sector thereof).

Figure 3:
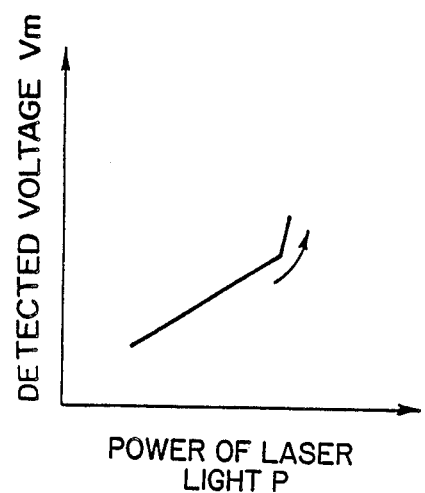
Figure 4:
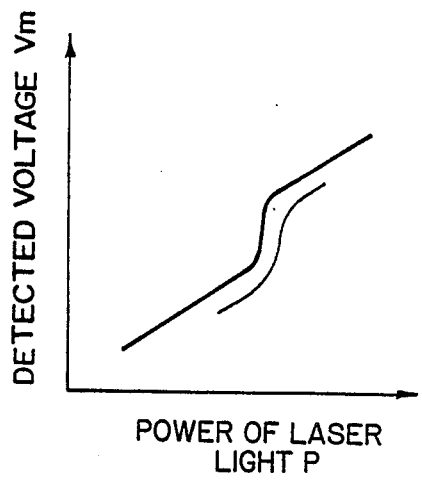

When the laser power P is increased, so that the reversal of the direction of magnetization starts at some portions of the recording medium, the detected voltage $V_m$ is further increased as shown in FIG. 3 and when the laser power P is further increased, the direction of magnetization results as shown in FIG. 4. Since the detected voltage $V_m$ is in proportion to the laser power P (or the quantity of illumination light), the relationship between the laser power P plotted along the abscissa and the ratio between the detected voltage $V_m$ and the laser power P (that is, $V_m/P$) plotted along the ordinate is obtained as shown in FIG. 5.

Figure 5:
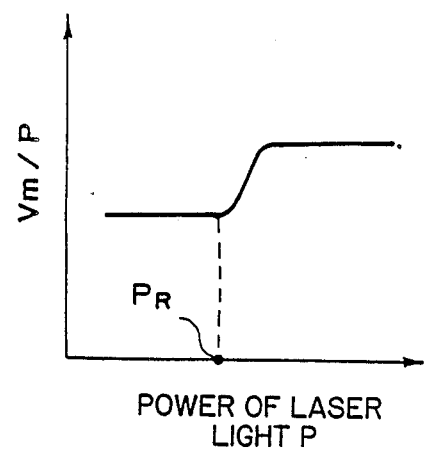

As is apparent from FIG. 5, when the laser power P rises in excess of a threshold value $P_R$ at which the ratio $V_m/P$ is suddenly increased, the reversal of the direction of magnetization results locally in the recording medium. This means that the reproducing laser beam power is increased in excess of an optimum readout level. In other words, the reproducing laser power is determined at a level slightly lower than the threshold value $P_R$.

FIG. 6 is a schematic view illustrating the construction of an optomagnetic (magneto-optical) information reproducing or readout device of the present invention which can determine an optimum reproducing laser power based upon the above described method.

In FIG. 6, reference numeral 10 denotes a semi-conductor laser; 11, a collimator lens; 12, a polarizer; 13, a beam splitter; 14, an objective lens; 15, an analyzer; 16, a sensor lens; 17, a detector comprising, for instance, a PIN photodiode or the like; 18, an optical system; 19, an optomagnetic disk; 20, a turn table; 21, a motor for rotating the turn table 20; 22, a device for generating an auxiliary magnetic field; 23, an A/D converter for converting the signal obtained by the optoelectric conversion by the detector into the digital signal; 24, a controller comprising a CPU, RAMs and so on; and 25, a laser driver.

FIG. 7 is a sectional view illustrating the construction of an optomagnetic (magneto-optic) disk 19. Reference numeral 31 designates a substrate such as a glass plate; 32, a resin hardened when exposed to light (no guide groove is shown); 33, a dielectric film; 34, a vertically magnetized film for storage of information; and 35, a protective film.

Now referring back to FIG. 6, the laser light emitted from the semiconductor laser 10 is collimated by the collimator lens 11 and the collimated laser light passes through the polarizer 12 and the beam splitter 13 and is focused as a beam spot on the optomagnetic (magneto-optic) disk 19. The light reflected back from the disk 19 passes the objective lens and is reflected by a multi-layer film disposed diagonally across the beam splitter 13 and is focused on the detector 17 through the analyzer 15 and the sensor lens 16. The signal which is obtained by the photoelectric conversion of the detector 17 and represents the degree of polarization is processed by utilizing the above-described underlying principle of the present invention, and is used to determine the quantity of the reproducing laser beam.

The signal is processed in the manner described below. After an information storage region having some area (one track in this embodiment) is magnetized, the laser beam power P is set at a minimum level at which the focus servo and tracking servo of the laser beam power P emitted from the semi-conductor laser 10 can be accomplished in a stable manner.

The laser beam emitted from the semi-conductor laser 10 illuminates an information storage region and after the reflected beam is detected by the detector 17, the output signal therefrom is transmitted through the A/D converter 23 to the controller 24 which in turn calculates a detected voltage data Vi. The above-described operation is repeated n times at a suitable sampling time (for instance, 10 microseconds) to obtain a number of n data and then their average value given below: detected voltage $$V_m = \frac{\sum\limits_{i}^{n} Vi}{n}$$

Then the ratio ($V_m/P$) is obtained.

When the above-described sequence is repeated with the increase of the laser power P, the ratio $(V_m/P)_k$ is obtained at some laser beam power P and is stored. As is apparent from FIG. 5, when the laser power P is maintained at a level below a level at which the reversal of the direction of magnetization in the disk 19 does not occur, the value of the ratio $(B_m/P)_k$ remains substantially unchanged. Therefore, the difference between the ratio $(B_m/P)_k$ for the set laser power and the average value $$\frac{\sum_{i=1}^{k-1} (V_m/P)_1}{k-1}$$

becomes as follows:

$$\left| (V_m/P)_k - \frac{\sum_{i=1}^{k-1} (V_m/P)_2}{k-1} \right| \approx 0 < \delta \quad (1)$$

where $\delta$ is a value preset by the controller 24 and is, for instance, $$\frac{\sum_{i=1}^{k-1} (V_m/P)_{vi}}{k-1} \times \frac{1}{100}$$

When the storage region of the disk starts the reversal of the direction of magnetization in response to a predetermined laser power P, the ratio $(V_m/P)_k$ increases and the above-described difference becomes $$\left| (V_m/P)_k - \frac{\sum_{i=1}^{k-1} (V_m/P)_1}{k-1} \right| > \delta \quad (2)$$

Therefore if $\delta$ is set to a relatively small value, the controller 24 determines a laser power level at which equation (2) is first satisfied as a $P_R$ point shown in FIG. 5.

During the above-described sequence, a track is, of course, endlessly scanned for reproduction or readout of stored information.

Figure 8:
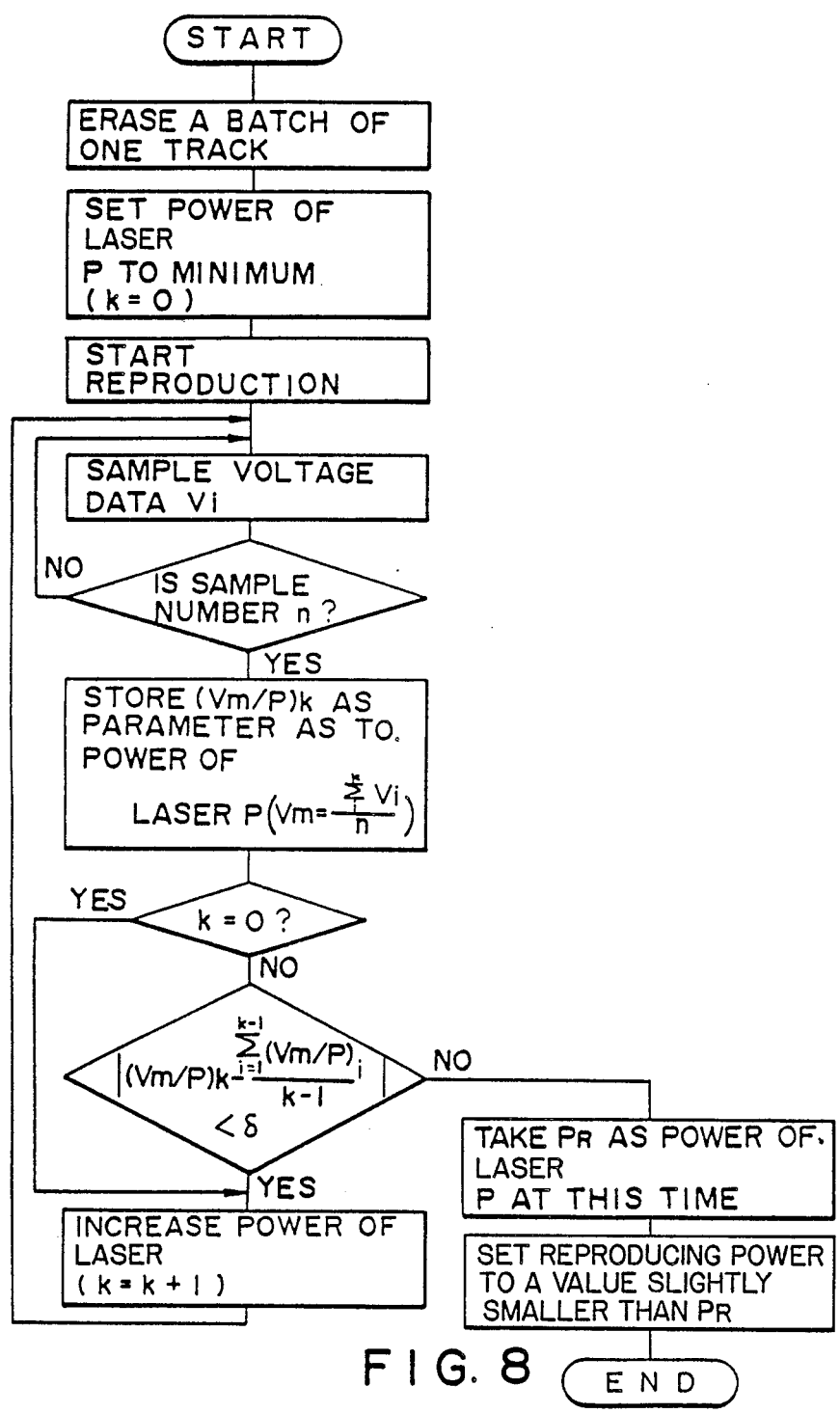
FIG. 8 shows a flowchart used to explain the steps of the information readout method in accordance with the present invention.

The flowchart of the sequence carried out by the controller 24 in the manner described above is shown in FIG. 8.

Next, a more practical embodiment or example will be described.

In a device in which the laser power P is controlled with the range between 0.8 and 3.0 mW and its pitch is determined at 0.2 mW, under the conditions that the rotational speed is 1800 rpm, the magnetic layer of the recording medium (disk) of the type shown in FIG. 7 is TbFeCo and its dielectric film consists of ZnS and the sampling number n is ten, the above-described sequence was accomplished and it was found out that the $P_R$ point is obtained when the laser power P is 2.6 mW. In this case, $V_m/P=0.2$ and $\delta=0.02$.

In the above-described embodiment, a laser drive current value is used to monitor the laser power, but it is to be understood that the present invention is not limited thereto and that the output voltage value from the PIN diode attached to a laser chip can be used.

The underlying principle of the present invention is that the reversal in direction of magnetization in the reproducing or readout mode is detected by the point $P_R$ (which is represented in terms of the laser output but which may be also represented in terms of the quantity of illuminating light) being detected as shown in FIG. 5 and then a threshold quantity of light at which no reversal in direction of magnetization occurs is detected. Therefore, any suitable means may be used as the means for detecting the reversal in direction of magnetization in a domain by means of a polarized condition.

In addition, in the reproducing or readout mode, it is apparent, in addition to the method which is of the reflection type and the uses the Kerr rotation, the present invention may be applied to a device which is of the transparent type and detects the polarized state by utilizing the Faraday effect.

Furthermore, in general, the determination of the quantity of reproducing light is accomplished only one time prior to the start of the reproducing or readout mode of a device, but it is to be understood that the present invention can be modified in various ways. For instance, the number of setting the quantity of light may be increased depending upon the operating conditions (such as temperature, humidity and so on) of a device.

We claim:

1. A method for setting a suitable light power for reproducing or reading out information from an optical recording medium, comprising the steps of:
    illuminating a light flux to the recording medium while varying the light quantity of the illuminating light flux;
    detecting the light quantity of the reflected light or transmitted light of the illuminating light flux reflected by or transmitted through the recording medium;
    calculating a present ratio between the light quantity of the detected light and the light quantity of the corresponding illuminated light flux, and concluding the varying of the light quantity of the illuminated flux at a time when the ratio exceeds a threshold ratio; and
    setting a light quantity which is smaller than the light quantity of the illuminated light flux at the threshold ratio as a light quantity for reproduction of the information.

2. A method as set forth in claim 1, wherein the variation in the quantity of the illuminating light flux is made by increasing the quantity of light stepwise by a predetermined quantity at one time.

3. A method as set forth in claim 1, wherein the detection is repeated several times for the same quantity of illuminating light and the average of the detection is used as the light quantity of the detected light.

4. An apparatus for setting a suitable light power for reproducing or reading out information recorded on an optical recording medium, comprising:
    means for illuminating a light flux to the recording medium;
    means for detecting the light quantity of a reflected light or transmitted light of the illuminated light flux reflected by or transmitted through the recording medium;
    means for changing the light quantity of the illuminated light flux gradually;
    means for sampling a plurality of varying light quantities of the illuminated light flux and the corresponding light quantities detected by said detecting means;
    means for calculating a ratio between the light quantity of the illuminated flux and the detected light quantity corresponding to the light quantity of the illuminated light flux; and
    means for monitoring the calculated ratio, concluding the light quantity of the illuminated light flux at a time when the ratio starts to increase from a threshold ratio and setting a light quantity which is smaller than the light quantity of the illuminated light flux at the threshold ratio as a light quantity for reproduction or reading out of the information.

5. A device as set forth in claim 4, wherein said light flux illuminating means comprises a semiconductor laser and a laser driver for driving said semiconductor laser.

6. A device as set forth in claim 5, wherein said detecting means comprises a analyzer inserted into the path of the light reflected from the recording medium and a detector for receiving the light passing through said analyzer.

* * * * *

UNITED STATES PATENT AND TRADEMARK OFFICE
CERTIFICATE OF CORRECTION

PATENT NO. : 4,937,799

DATED : June 26, 1990

INVENTOR(S) : Norio Hashimoto, et al.

It is certified that error appears in the above-identified patent and that said Letters Patent is hereby corrected as shown below:

COLUMN 1

Line 16, "art" should read --Art--;
    Line 44, "impinged upon by with" should read --not impinged upon by--.

COLUMN 2

Line 6, "of individual" should read --of an individual--;
    Line 7, "an" should be deleted;
    Line 64, "FIGS. 1A-1C," should read --FIGS. 1A-1D,--.

COLUMN 3

Line 35, "uniformally" should read --uniformly--.

UNITED STATES PATENT AND TRADEMARK OFFICE
CERTIFICATE OF CORRECTION

PATENT NO. : 4,937,799

DATED : June 26, 1990

INVENTOR(S) : Norio Hashimoto, et al.

It is certified that error appears in the above-identified patent and that said Letters Patent is hereby corrected as shown below:

COLUMN 4

Line 67, "ratio $(B_m/P)_k$" should read --ratio $(V_m/P)_k$--.

COLUMN 5

Line 1, "ratio $(B_m/P)_k$" should read --ratio $(V_m/P)_k$--;

Line 11, "$(V_m/P)_2$" (in the equation) should read --$(V_m/P)_i$--; and "j=1" should read --i=1--;

Line 28, "$(V_m/P)_1$" (in the equation) should read --$(V_m/P)_i$--; and "j=1" should read --i=1--.

COLUMN 6

Line 62, "illuminated flux" should read --illuminated light flux--;

UNITED STATES PATENT AND TRADEMARK OFFICE
CERTIFICATE OF CORRECTION

PATENT NO. : 4,937,799

DATED : June 26, 1990

INVENTOR(S) : Norio Hashimoto, et al.

It is certified that error appears in the above-identified patent and that said Letters Patent is hereby corrected as shown below:

COLUMN 7

Line 6, "A device" should read --An apparatus--.

COLUMN 8

Line 3, "A device" should read --An apparatus--;
    Line 4, "a" should read --an--.

Signed and Sealed this

Eighth Day of December, 1992

Attest:

DOUGLAS B. COMER

Attesting Officer      Acting Commissioner of Patents and Trademarks